Patented May 18, 1937

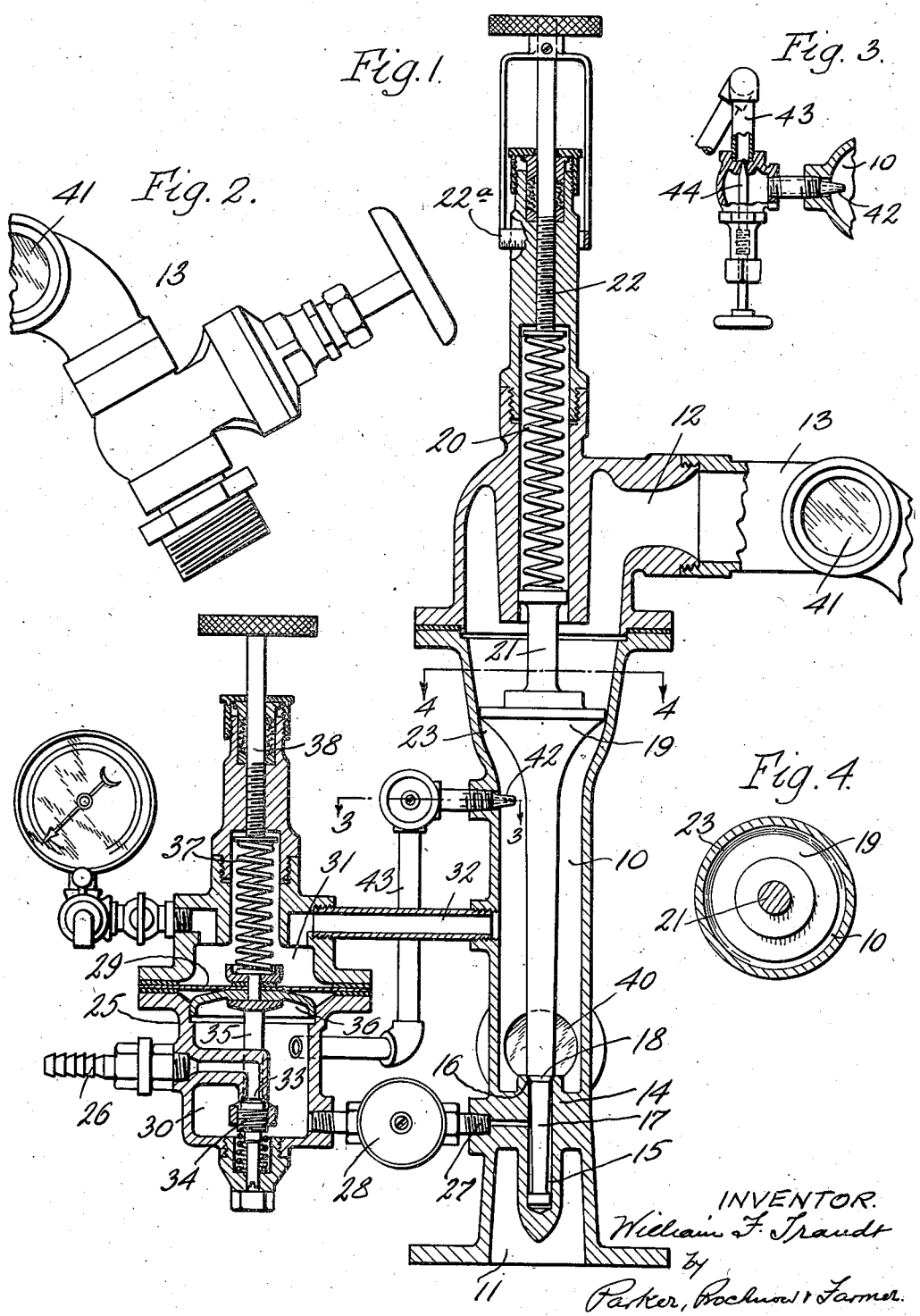

2,080,940

UNITED STATES PATENT OFFICE 2,080,940

FLUID MIXING APPARATUS

William F. Traudt, Buffalo, N. Y.

Application October 26, 1935, Serial No. 46,890

5 Claims. (Cl. 261—43)

This invention relates to apparatus for automatically mixing fluids in desired regulated proportions. The apparatus disclosed in this application as an embodiment of my invention is primarily intended for charging liquids with gases, as for instance, for carbonating beer and other liquids by charging the same with carbonic acid gas, but the apparatus is also adapted for mixing either liquids or gases. In this specification, in the interest of clarity of description, the fluids to be mixed are designated respectively "liquid" and "gas", but it is not thereby intended to limit the invention to use for mixing a gas with a liquid.

The apparatus as herein disclosed comprises a mixing chamber or conduit which is connected with a pump or other source of liquid under pressure and through which the liquid flows, a gas supply valve or device connected with a source of gas under pressure and arranged to discharge the gas into the liquid flowing through said mixing chamber or conduit, and an operating plunger or member for said gas valve arranged to be moved by the flowing liquid for actuating said valve to regulate the supply of the gas to the liquid. The gas is supplied to the liquid through the medium of a differential pressure-reducing valve or device operating under control of the pressures of the liquid and the gas.

Apparatus of this general nature for charging liquids with gas and having a movable member actuated either by the pressure of the liquid or of the fluid mixture for operating a supply valve to regulate the discharge of the gas into the liquid are known, but in such known apparatus the free passage for the flow of the fluids through the mixing chamber remains constant or else is varied in such a way that the pressure in the mixing chamber varies with changes in the rate of flow or pressure of the liquid, and it is difficult or impractical to insure a mixture of constant proportions of the liquid and gas where the rate of flow or supply of liquid varies substantially.

One object of my invention is to improve fluid mixing apparatus of the character mentioned so as to insure a uniform fluid mixture irrespective of variations in the flow or supply of one or both of the fluids.

Other objects of the invention are to produce an automatic apparatus for charging liquids with a gas, which will insure a uniform amount of gas in the liquid flowing through the apparatus, regardless of variations in the flow of the liquid; by which fluids can be mixed in different desired proportions and which, when set for a particular proportionate mixture, will operate automatically to maintain the proportions constant notwithstanding variations in the rates of flow or pressures of the fluids; in which the pressure in the fluid mixing chamber will be kept uniform for different flows of fluid therethrough, or in which the rate of fluid flow through the apparatus may vary without varying the fluid pressure which is utilized to regulate the supply of one fluid for the mixture; to provide means whereby one fluid can be mixed in required, minute quantities with great accuracy with another fluid; and to provide apparatus for mixing fluids which has the other features of improvement and advantage hereinafter described and set forth in the claims.

In the accompanying drawing:

Fig. 1 is a sectional elevation of a fluid mixing apparatus embodying my invention.

Fig. 2 is an elevation of the outlet end and valve of the apparatus, not shown, in Fig. 1.

Fig. 3 is a sectional plan view of the finishing gas injector of the apparatus on line 3—3, Fig. 1.

Fig. 4 is a horizontal section of the apparatus on line 4—4, Fig. 1.

10 represents a conduit or mixing chamber having at one end a liquid inlet opening 11 adapted to be connected with the discharge of a pump or other source of liquid under pressure, and an outlet 12 for the mixed liquid and gas which preferably is contracted between its ends and of smaller diameter than the conduit 10, and is arranged in a laterally directed portion 13 at the opposite end of the mixing chamber.

Gas is discharged into the mixing chamber 10 through a regulating valve preferably comprising a valve body 14 arranged in the inlet end portion of the mixing chamber and having an axial bore 15 terminating at its inner or upper end in a conical valve seat 16, and a valve rod or plug having a portion 17 movable axially in the bore 15 and a conical circumferential face 18 adapted to engage the seat 16 to close the valve. The valve plug 17 is connected to or formed by one end of a plunger which extends and is movable axially in the mixing chamber and is provided with an enlarged head or portion 19 against which the liquid flowing through the mixing chamber acts so as to tend to move the plunger in the direction of flow of the liquid. The movement of this plunger by the liquid is yieldingly opposed by a suitable resistance device adapted to offer regulated resistance to the movement of the plunger. The resistance device shown for this purpose consists of a spring 20 arranged in an axial cavity in the outlet end portion of the mixing chamber between an extension 21 of the plunger and an adjusting screw 22, so that by appropriate adjustment of the screw, the pressure of the spring on the plunger can be regulated to offer greater or less resistance to the movement of the plunger by the liquid. The adjusting screw may be provided with an indicator 22a having a graduated scale to show the spring pressures at different adjustments of the screw.

The construction of the plunger head and a cooperating part relatively to which it moves is such that the passage for the flow of the fluids through the mixing chamber is varied in size or area, depending upon the position to which the plunger is moved by the fluid pressure acting thereon.

Preferably, the head 19 of the plunger is solid and of the conical or flaring shape shown, and is arranged to move in a throat or portion 23 of the conduit 10, which flares or increases gradually in diameter in the direction of flow of the liquid through the conduit. When the gas discharge valve plug 17 is in its innermost or closed position, the plunger head 19 will be in the contracted or small end of the throat 23, and will close or substantially close the throat so as to restrict or shut off the passage of liquid therethrough while outward movement of the plunger head will provide an annular space or clearance of gradually increasing area between the periphery of the plunger head and the flaring walls of the throat 23, so that the farther the plunger is moved by the fluid pressure thereon, the greater will be the area of the clearance or passage for the flow of fluid around the plunger. The flare of the throat is preferably such that the passage for the liquid around the plunger will be increased in direct proportion to the longitudinal movement of the plunger. That is to say, a one-half inch movement of the plunger, for example, will give a passage for the fluid one-half as large in area as the passage formed by a one inch movement of the plunger.

The gas valve plug 17 moves with the plunger and operates the gas supply valve to increase and decrease the supply of gas to the mixing chamber in direct proportion with variations in flow of the fluid mixture through the mixing chamber. Preferably, the plug 17 is tapered or gradually reduced in diameter toward its lower or inner end, while the bore 15 of the valve is cylindrical so that the area of the clearance or space between the valve plug and the mouth of the bore 15 will be increased or decreased in direct proportion with increases or decreases in area of the clearance or passage for the liquid between the plunger head 19 and the throat of the mixing chamber. In other words, the tapers of the valve plug 17 and of the throat 23 are such that a movement of the plunger sufficient to double the flow of the liquid past the plunger head will double the discharge of the gas from the valve 14.

The gas is delivered to the supply regulating valve 14 through a differential pressure reducing valve 25 which is connected by a pipe 26 with a suitable source of gas under a pressure greater than the maximum fluid pressure in the mixing chamber 10, and is connected with the gas discharge valve 14 by a pipe or passage 27 preferably provided with a hand operated shut-off valve 28. As shown, the chambered interior of the casing of the differential valve is divided, by a pressure-actuated flexible diaphragm or movable element 29, into two chambers 30 and 31. The gas supply pipe or passage 26 and the passage 27 leading to the gas supply valve connect with the chamber 30, while the chamber 31 is connected by a pipe or passage 32 with the mixing chamber or conduit 10, so that the gas pressure in the chamber 30 acts on the diaphragm or element 29 in opposition to the fluid pressure which exists in the mixing chamber and is communicated to the chamber 31 of the differential valve. The gas supply passage 26 terminates, in the chamber 30, in a discharge orifice 33 which is controlled by a movable valve plug or member 34 connected, as by a yoke 35, to the diaphragm or element 29 so that the valve plug will be moved to open or close the orifice by the movement of the diaphragm or element 29. A piston or disk 36 is shown attached centrally to the diaphragm 29 and slidably fitting in the cylindrical chamber 30. This piston serves to guide the valve plug 34 in its movements. A spring 37 in the chamber 31 presses at its inner end against the diaphragm 29 and at its outer end against an adjusting screw 38 by which the pressure of the spring on the diaphragm can be regulated as desired. This spring acts with the pressure in the chamber 31 on the diaphragm in opposition to gas pressure in the chamber 30, so that the differential valve 34 will be opened and held open until the gas pressure in the chamber 30 is sufficient to overbalance the mixing chamber pressure in the chamber 31 plus the pressure of the spring 37. If, for example, the spring 37 is not under compression and the fluid pressure in the mixing chamber and chamber 31 tending to open the valve 34 is sixty pounds, a slightly higher gas pressure will be required in the chamber 30 to overbalance this pressure and close the valve, and if the spring is set to exert a pressure of two pounds, then a gas pressure of two pounds more, or slightly over sixty-two pounds, in the chamber 30 will close the valve 34. By adjusting the screw 38, the spring can be set to exert any desired differential pressure required to close the differential valve. The valve can therefore be adjusted to operate upon any desired difference in pressure of the gas over the fluid pressure in the mixing chamber, and the valve will operate at this differential pressure irrespective of whatever may be the pressure in the mixing chamber. That is, the differential valve will be operated by the same differential pressure whether the pressure in the mixing chamber be sixty pounds or a greater or less pressure.

In the use of the apparatus, for instance, if thirty gallons of liquid per minute are passing through the mixing chamber the plunger head will be moved to a position to give the necessary annular clearance around it to allow this quantity to pass freely. If the capacity is increased to say sixty gallons per minute, then the clearance around the plunger head will be increased sufficiently to allow this quantity to pass through freely, thus keeping the pressure within the mixing chamber substantially uniform for different flows, because the annular clearance is in substantially direct proportion to the rate of flow. Since the clearance around the plug 17 of the gas supply valve varies in direct proportion to the variations in the clearance around the plunger head 19 and to the flow of the liquid through the mixing chamber, the quantity of gas supplied to the liquid will be varied in direct proportion with changes in the rate of flow of the liquid. Thus, if the liquid capacity is doubled, the gas supply will be likewise doubled. The gas will pass through the differential valve 34 and the supply regulating valve 14 into the mixing chamber 10 and the gas and liquid will be mixed. The mixture will pass through the annular clearance around the plunger head 19 and pass through the outlet. The supply of gas and the mixture of gas and liquid can be observed through suitable windows or sight glasses 40 and 41, preferably provided on the mixing chamber opposite the valve 14 and on the discharge pipe beyond and adjacent the outlet. The high velocity with which the mixture passes through the apparatus and particularly through the clearance around the plunger head 19, together with the high velocity through the constricted outlet, causes the liquid and gas to be thoroughly intermixed in fine particles for rapid absorption of the gas.

The apparatus insures a uniform injection of gas into the liquid passing through the apparatus irrespective of changes in the flow or volume of liquid passing. If greater or less proportions of gas are required, the differential between the gas and liquid pressures is increased or decreased as necessary by appropriate adjustment of the screw 38 to increase or decrease the pressure of the differential valve spring 37. This differential may be anywhere from a fraction of a pound to many pounds. The shifting of the supply valve plug 17 by the plunger 19 therefore regulates the volume of gas supplied under a predetermined differential pressure so that the relationship of the gas to the liquid will remain constant and effect a uniform mixture at the predetermined desired proportion of gas which is an important result sought in carbonating beer and other beverages.

In making beer it some times happens that after it has passed through the described apparatus and been carbonated, it may be desirable from one or another cause, to finish it by adding a very minute further amount of the carbonic acid gas, and in order to accomplish this with reliable precision, the apparatus is furnished with a fine jet injector or nozzle 42 connected, as by a pipe 43, with the chamber 30 of the differential valve and arranged to discharge the gas into the beer in the mixing chamber 10 before it passes the plunger head 19. The discharge from this nozzle is controlled by a fine needle valve 44 which enables the gas to be added to the charged beer in the desired minute quantity with great precision. This finishing gas is added at the differential pressure required for best results by means of the adjustable differential valve 25, and is thoroughly mixed with the beer in passing through the small clearance around the plunger head and through the constricted outlet 12, thus resulting in a very superior quality of beer.

I claim as my invention:

1. In a mixing apparatus for fluids, a mixing chamber through which the fluids flow, a device which is actuated by the fluid pressure and increases and decreases the passage for the fluid through the mixing chamber respectively according to increases and decreases in the volume of one fluid supplied, a supply device for another fluid operated by said first mentioned device to vary the supply of said other fluid in proportion to variations in the volume of the first fluid passing through the mixing chamber, and a differential pressure device which maintains a substantially predetermined differential between the pressures of the said other fluid and in the mixing chamber.

2. In a liquid and gas mixing apparatus, a mixing chamber through which the liquid flows, a device which is actuated by the flowing liquid and varies the passage for the flow of the liquid through the mixing chamber according to variations in the volume of the liquid supplied, a supply device for gas under pressure operated by said first mentioned device to vary the supply of gas in proportion to variations in the volume of liquid passing through the mixing chamber, and a differential pressure device which maintains a substantially predetermined difference between the pressure of the gas supplied and the pressure in the mixing chamber.

3. In a mixing apparatus for fluids, a mixing chamber through which the fluids flow, a device which is actuated by the fluid pressure and varies the passage for the flow of fluid through the mixing chamber according to the variations in the volume of one fluid supplied, a supply device for another fluid operated by said first mentioned device to vary the supply of said other fluid in proportion to variations in the volume of the first fluid passing through the mixing chamber, a differential pressure device which maintains a substantially predetermined differential between the pressures of the said other fluid and in the mixing chamber, and a valve regulated jet device through which said other fluid is delivered to the fluid mixture passing through the mixing chamber under control of said differential pressure device.

4. In a mixing apparatus for fluids, a mixing chamber through which the fluids flow, a plunger in the mixing chamber which is moved therein by the flowing fluid to different positions according to the rate of supply of one fluid to the mixing chamber, said plunger and the surrounding wall of the mixing chamber being so constructed and related that the clearance for the passage of fluid through the mixing chamber past the plunger is increased and decreased by the movements of the plunger in accordance with increases and decreases in the supply of said one fluid to the mixing chamber, a supply device for another fluid operated by said plunger to vary the supply of said other fluid in proportion to variations in the volume of the first fluid passing through the mixing chamber, and a differential pressure device which maintains a substantially predetermined differential between the pressures of the said other fluid and in the mixing chamber.

5. In a mixing apparatus for fluids, a mixing chamber through which the fluids flow, a plunger in the mixing chamber which is moved therein by the flowing fluid to different positions according to the rate of supply of one fluid to the mixing chamber, said plunger and the surrounding wall of the mixing chamber being so constructed and related that the clearance for the passage of fluid through the mixing chamber past the plunger is increased and decreased by the movements of the plunger to maintain a substantially constant fluid pressure in the mixing chamber with different rates of supply of said one fluid to the mixing chamber, a supply device for another fluid operated by said plunger to vary the supply of said other fluid in proportion to variations in the volume of the first fluid passing through the mixing chamber, and a differential pressure device which maintains a substantially predetermined differential between the pressures of the said other fluid and in the mixing chamber.

WILLIAM F. TRAUDT.